(12) United States Patent
Nishioka

(10) Patent No.: US 7,162,352 B1
(45) Date of Patent: Jan. 9, 2007

(54) ELECTRONIC APPARATUS AND METHOD OF CORRECTING OFFSET VALUE OF ACCELERATION SENSOR

(75) Inventor: Hisaya Nishioka, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/473,118

(22) Filed: Jun. 23, 2006

(30) Foreign Application Priority Data

Jun. 30, 2005 (JP) ............................. 2005-193057

(51) Int. Cl.
G06F 7/70 (2006.01)
(52) U.S. Cl. ............................. 701/74; 701/70; 701/75
(58) Field of Classification Search .................... 701/1, 701/34, 36, 70, 74, 75; 340/428, 449, 440
See application file for complete search history.

(56) References Cited

U.S. PATENT DOCUMENTS

| | | | | |
|---|---|---|---|---|
| 6,295,486 B1 * | 9/2001 | Denz | ............................. | 701/1 |
| 6,314,329 B1 * | 11/2001 | Madau et al. | .................. | 700/89 |
| 7,010,409 B1 * | 3/2006 | Lu et al. | ........................ | 701/70 |
| 7,092,808 B1 * | 8/2006 | Lu et al. | ........................ | 701/70 |

FOREIGN PATENT DOCUMENTS

| | | |
|---|---|---|
| JP | 10-132849 | 5/1998 |
| JP | 2004-085562 | 3/2004 |
| JP | 2004-294110 | 10/2004 |

\* cited by examiner

*Primary Examiner*—Richard M. Camby
(74) *Attorney, Agent, or Firm*—Pillsbury Winthrop Shaw Pittman, LLP

(57) ABSTRACT

According to one embodiment, an electronic apparatus includes acceleration computing unit correcting an output value from a acceleration sensor with an offset value so as to obtain an acceleration of a body, rest determining unit determining whether or not the body is at rest based on an output value from the acceleration sensor, when a absolute value of a temperature difference between a measurement temperature and a reference temperature exceeds a predetermined value, level determining unit determining whether or not the body is on the level based on the output value from the acceleration sensor and the offset value, when it is determined that the body is at rest, and offset value updating unit setting a new offset value corresponding to an output value outputted from the acceleration sensor and setting the measurement temperature as a new reference temperature, when it is determined that the body is on the level.

8 Claims, 4 Drawing Sheets

W1

Correction of acceleration sensor
With the apparatus on the level, press the "OK" button.
Condition in which the "OK" button is pressed is stored as level condition.
Unless correction is performed, press the cancel button.

OK  B1    Cancel  B2

Cancel correction of acceleration sensor and turn OFF correction function.

OK  B3    Cancel  B4

FIG. 5

ELECTRONIC APPARATUS AND METHOD OF CORRECTING OFFSET VALUE OF ACCELERATION SENSOR

CROSS-REFERENCE TO RELATED APPLICATIONS

This application is based upon and claims the benefit of priority from Japanese Patent Application No. 2005-193057, filed Jun. 30, 2005, the entire contents of which are incorporated herein by reference.

BACKGROUND

1. Field

One embodiment of the invention relates to an electronic apparatus having an acceleration sensor and a method of correcting an offset value of the acceleration sensor.

2. Description of the Related Art

Currently, micro electro mechanical system (MEMS) technology has been developed and a semiconductor acceleration sensor has been widely used.

For example, a notebook personal computer equipped with the acceleration sensor has been shipped. If an abnormal motion is detected by the acceleration sensor, the magnetic head of a hard disk drive is retreated so as to reduce a danger of hard disk drive crush.

Further, in some computers, the acceleration sensor is mounted on its rotatable display. By detecting the direction of the display with the acceleration sensor and automatically outputting a video signal of a resolution corresponding to a detection signal to the display, labor for user's changing the resolution is eliminated.

By the way, the output value of the acceleration sensor is strongly affected by temperatures. Thus, if the temperature changes largely, it needs to be temperature-compensated. Jpn. Pat. Appln. KOKAI Publication No. 2004-294110 has disclosed a technology for memorizing the correction amount of an offset value corresponding to each correction object temperature defined by dividing a predetermined temperature range at a predetermined interval as temperature correction data.

The acceleration sensor varies in its characteristic between one and another and sometimes the temperature characteristic of its output value indicates a completely different behavior depending on a product. However, the above-mentioned document has such a problem that it cannot absorb a difference in characteristic depending on products because the correction amount of an offset value corresponding to each correction object temperature defined by preliminary division is memorized, so that the offset value cannot be corrected accurately.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary diagram showing a message window displayed on an LCD; and FIG. 5 is an exemplary diagram showing a message window displayed on the LCD.

DETAILED DESCRIPTION

Various embodiments according to the invention will be described hereinafter with reference to the accompanying drawings. In general, according to one embodiment of the invention, an electronic apparatus comprises a main body, an acceleration sensor provided in the main body, a temperature sensor provided in the main body, offset value storage unit configure to store a reference temperature and an offset value corresponding to the reference temperature, acceleration computing unit configure to correct an output value from the acceleration sensor with an offset value stored in the offset value storage means unit so as to obtain an acceleration of the main body, temperature difference determining unit configure to determine whether or not an absolute value of a temperature difference between a measurement temperature measured by the temperature sensor and the reference temperature stored in the offset value storage unit exceeds a predetermined value, rest determining unit configure to determine whether or not the main body is at rest based on an output value from the acceleration sensor, when the temperature difference determining unit determines that the absolute value of the temperature difference exceeds a predetermined value, level determining unit configure to determine whether or not the main body is on the level based on the output value from the acceleration sensor and the offset value stored in the offset value storage unit, when the rest determining unit determines that the main body is at rest, and offset value updating unit for store a new offset value corresponding to an output value outputted from the acceleration sensor in the offset value storage unit and storing the measurement temperature in the offset value storage unit as a new reference temperature, when the level determining unit determines that the main body is on the level.

First, the structure of an information processing apparatus according to an embodiment of the present invention will be described with reference to FIGS. 1 and 2. This information processing apparatus is realized as a portable notebook personal computer 10 which can be driven with a battery.

Figure 1:
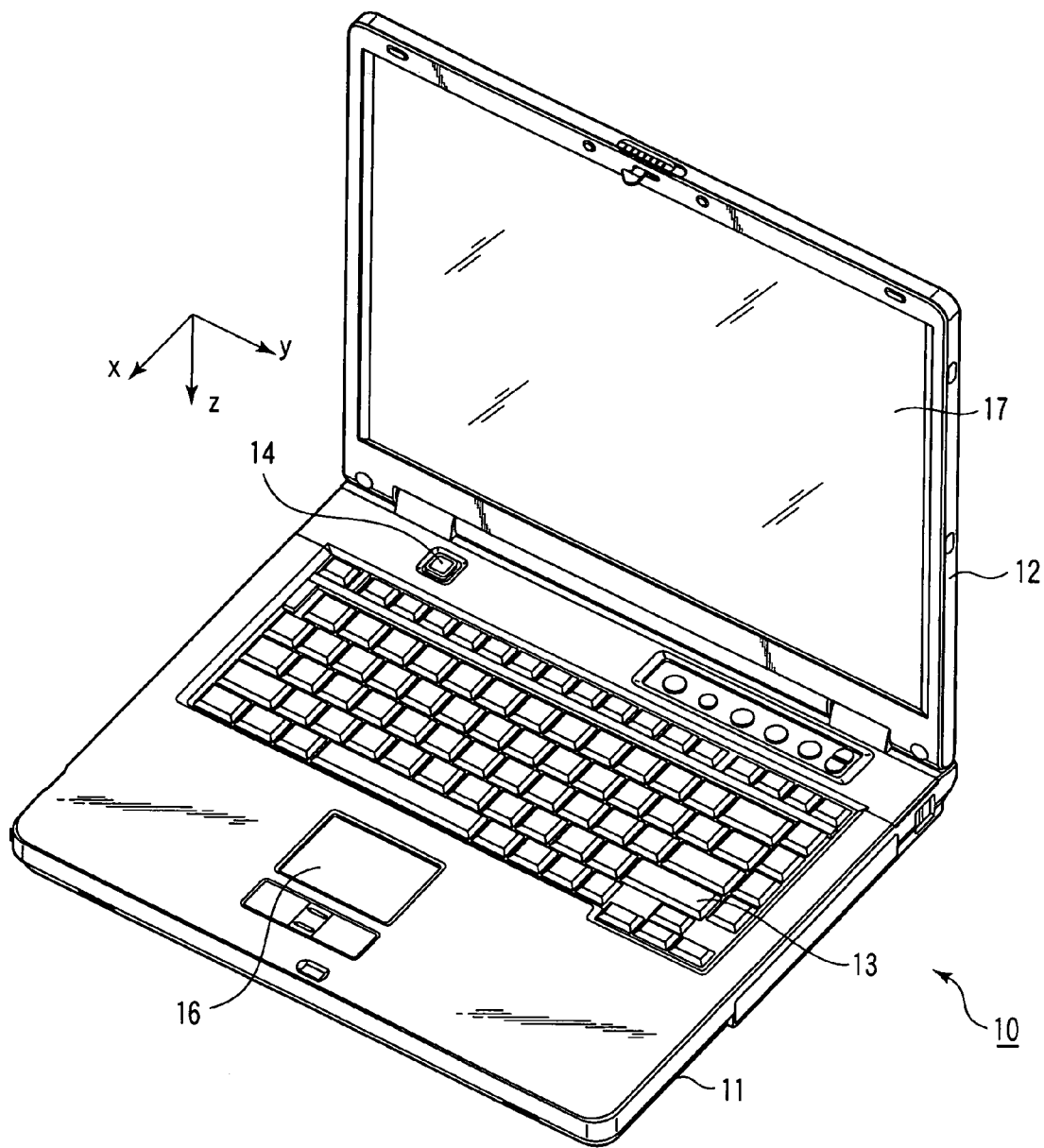
FIG. 1 is an exemplary diagram showing a structure of a notebook personal computer as an electronic apparatus and information processing apparatus according to an embodiment of the present invention.

FIG. 1 is a perspective view showing a condition in which the display unit of the notebook personal computer 10 is opened. This computer 10 is constituted of a computer main body 11 and a display unit 12. The display unit 12 incorporates a display device composed of a liquid crystal display (LCD) 17 and the display screen of the LCD 17 is disposed substantially in the center of the display unit 12.

The display unit 12 is installed to the computer main body 11 such that it can be rotated freely between its open position and its closed position. The computer main body 11 has a thin box-like casing and a keyboard 13, a power button 14 for turning ON/OFF the power of the computer 10 and a touch pad 16 are disposed on the top face of the casing.

Next, the system configuration of the computer 10 will be described with reference to FIG. 2.

Figure 2:
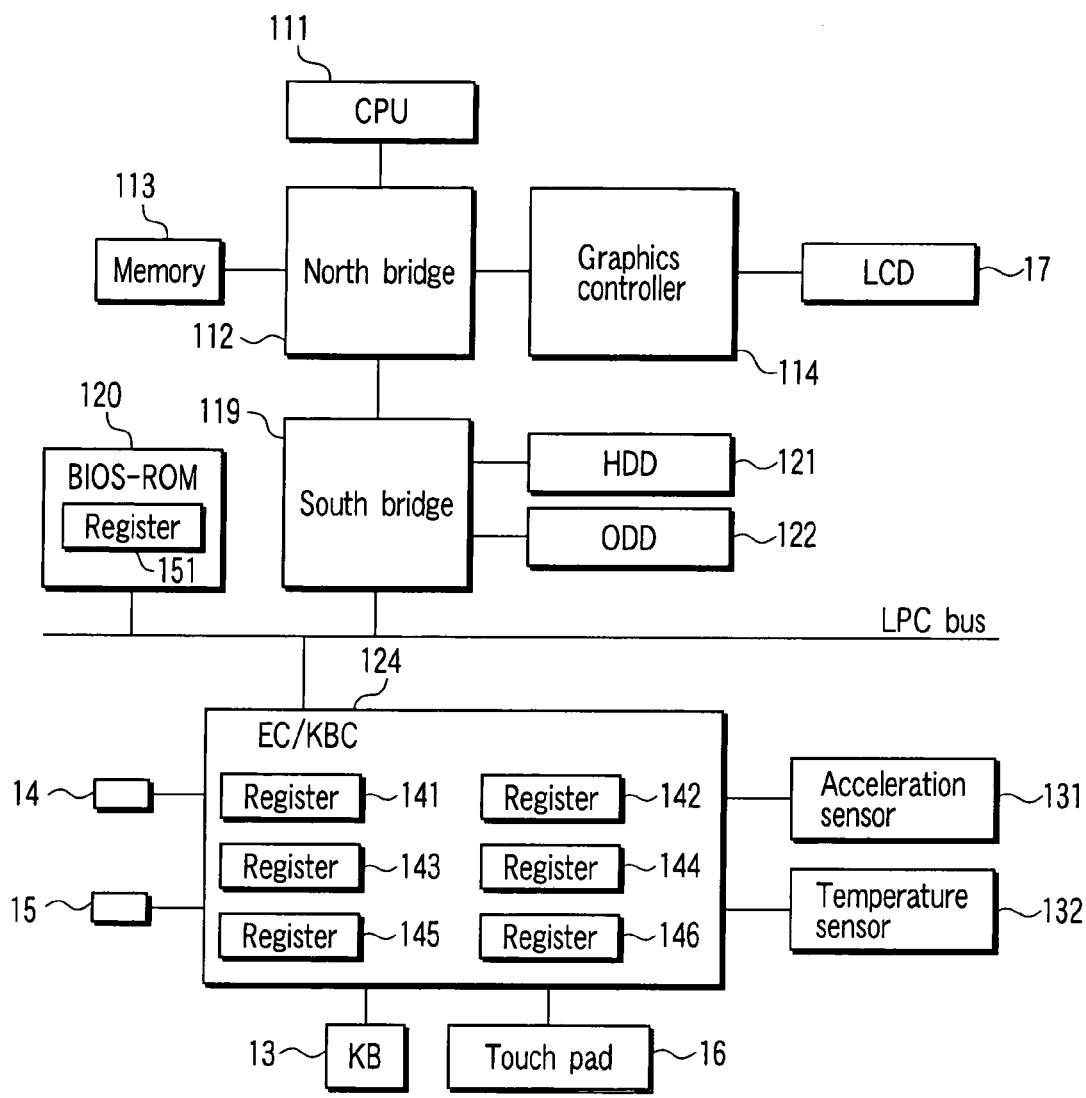
FIG. 2 is an exemplary block diagram showing a configuration of a personal computer system according to an embodiment of the present invention.

As shown in FIG. 2, the computer 10 includes a CPU 111, a north bridge 112, a main memory 113, a graphic controller 114, a south bridge 119, a BIOS-ROM 120, a hard disk drive (HDD) 121, an embedded controller/keyboard controller IC (EC/KBC) 124, a power controller 125 and the like.

The CPU 111 is a processor provided to control the operation of the computer 10 and executes an operating system (OS) and a variety of application programs loaded from the hard disk drive 121 to the main memory 113.

The CPU 111 executes the basic input output system (BIOS) program stored in the BIOS-ROM 120. The BIOS program is a program for controlling hardware.

The north bridge 112 is a bridge device which connects a local bus of the CPU 111 with the south bridge 119. The north bridge 112 incorporates a memory controller for access-controlling the main memory 113. The north bridge 112 includes a function for executing communication with the graphics controller 114 through accelerated graphic port (AGP) bus.

The graphics controller 114 is a display controller for controlling the LCD 17 used as a display monitor of the computer 10. This graphics controller 114 has a video memory (VRAM) 114A and generates a video signal for forming a display image to be displayed on the LCD 17 of the display unit 12 from display data written into the video memory 114A by an OS/application program.

The south bridge 119 controls each device on the low pin count (LPC) bus. The south bridge 119 incorporates an integrated drive electronics (IDE) controller for controlling the HDD 121. Further, the south bridge 119 includes a function for access-controlling the BIOS-ROM 120.

The acceleration sensor 131 outputs output values Vx, Vy, Vz corresponding to the x-axis component, y-axis component, z-axis component of an acceleration of the computer 10 and a force, for example, gravity applied to the computer 10. A temperature at that time is measured by a temperature sensor 132. As the acceleration sensor 131, any one of servo type, piezoelectric type, electrostatic capacitance type, piezoresistance type and the like is used.

The embedded controller/keyboard controller IC (EC/KBC) 124 is a 1-chip microcomputer in which the embedded controller for electricity control, a keyboard (KB) 13 and a keyboard controller for controlling the touch pad 16 are integrated. This embedded controller/keyboard controller IC (EC/KBC) 124 has a function for turning ON/OFF the power of the computer 10 corresponding to user's operation of the power button 14.

The EC/KBC 124 includes an offset value register 141 for storing offset values Voffset_x, Voffset_y, and Voffset_z. Further, the EC/KBC 124 includes a reference temperature register 142 for storing the temperature (reference temperature Ts) when the offset values Voffset_x, Voffset_y, and Voffset_z are set.

The EC/KBC 124 as an acceleration computing unit corrects the output values Vx, Vy, and Vz of the acceleration sensor 131 using the offset values Voffset_x, Voffset_y, and Voffset_z so as to obtain an acceleration of the computer 10.

Even if the computer 10 is at rest, the output value of the acceleration sensor 131 changes with a temperature. That is, the offset values Voffset_x, Voffset_y, and Voffset_z change with the temperature. The computer 10 has a function of resetting the offset values Voffset_x, Voffset_y, and Voffset_z when the temperature changes largely from a temperature (reference temperature Ts) in which the offset values Voffset_x, Voffset_y, and Voffset_z are set.

The computer 10 further includes a temperature difference range register 143 used for resetting the offset values Voffset_x, Voffset_y, and Voffset_z, a temperature difference register 144, an output value register 145 and a rest determination threshold register 146.

In the meantime, the function for correcting the offset value of the acceleration sensor can be set to be active/inactive by a user with utility operated on the BIOS or operating system (OS). The setting is registered in an ON/OFF setting register 151 in the BIOS-ROM.

In an application which does not require accurate inclination data, waste processing can be eliminated by turning off automatic correction function.

Figure 3:
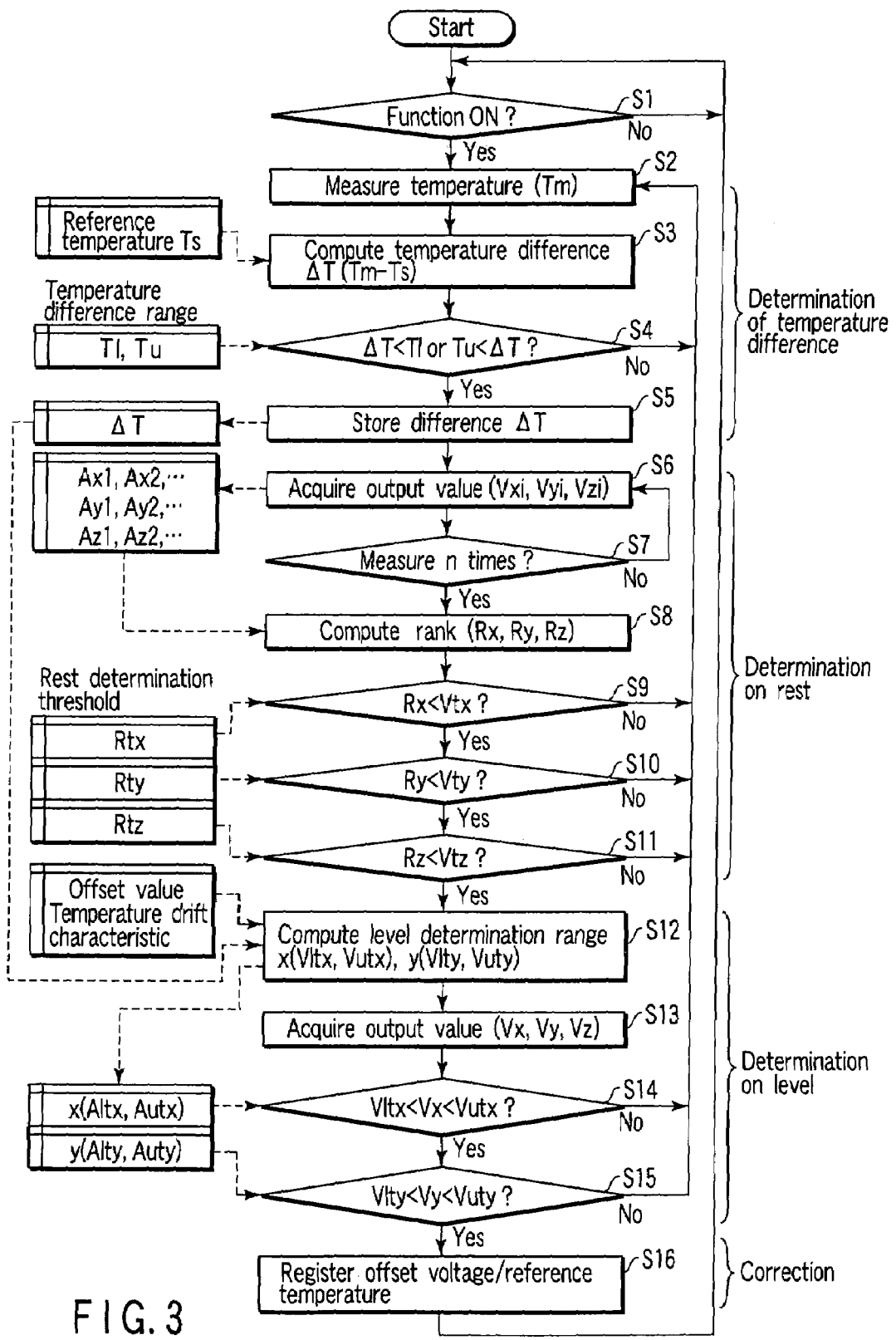
FIG. 3 is an exemplary flow chart showing the procedure of a method of correcting the offset value of an output value of the acceleration sensor according to an embodiment of the present invention.

Hereinafter, processing for changing the offset value will be described with referenced to the flow chart of FIG. 3.

First, the EC/KBC 124 determines whether or not the function for automatically correcting the offset value is turned ON with reference to the ON/OFF setting register 151 (block S1). Unless the function is turned ON (NO in block S1), no correction processing of the offset value is carried out.

If the function is turned ON (Yes in block S1), the EC/KBC 124 reads a current temperature Tm from a signal supplied from the temperature sensor 132 (block S2).

The EC/KBC 124 reads out the reference temperature Ts from the reference temperature register 142 and computes a temperature difference $\Delta T$ (=Tm−Ts) between the reference temperature Ts and a measured temperature Tm (block S3).

The EC/KBC 124 reads out an upper limit value Tu and a lower limit value Tl from the temperature difference range register 143 and determines whether or not the relation between the temperature difference $\Delta T$ and the upper limit value Tu/lower limit value Tl computed in block $S_3$ satisfies a condition of $\Delta T < Tl$ or $Tu < \Delta T$ (block $S_4$).

If the temperature difference $\Delta T$ is the lower limit value Tl or more and the upper limit value Tu or less (No in block $S_4$), the procedure returns to block S2 in which the temperature is measured again. If the temperature difference $\Delta T$ is smaller than the lower limit value Tl or larger than the upper limit value Tu (Yes in block S4), EC/KBC 124 is determined that the temperature drift correction is needed and the temperature difference $\Delta T$ is stored in the temperature difference register 144 (block S5). Then, rest determination processing of determining whether or not the personal computer 10 in block S6 to block S11 is at rest is carried out.

Block S4 will be explained by exemplifying a case where the reference temperature is 25° C., the upper limit value Tu is +3° C. and the lower limit value Tl is −3° C. If the measured temperature Tm is 23° C., the temperature difference $\Delta T$ is −2° C. (=23 [° C.]−25 [° C.]), which does not satisfy the condition of $\Delta T < Tl$ or $Tu < \Delta T$, and thus, the procedure returns to block S2 and temperature monitor is continued.

If the measured temperature Tm is 28° C., the temperature difference $\Delta T$ is +3° C. (=28 [° C.]−25 [° C.]), which satisfies the condition of $\Delta T < Tl$ or $Tu < \Delta T$ and thus, the procedure proceeds to next rest determination processing.

"Rest determination processing" will be described. The EC/KBC 124 as the rest determination unit acquires x-axis output value Vx1, y-axis output value Vy1 and z-axis output value Vz1 n times (block S6, block S7). The x-axis output value Vxi (i=1, . . . n), y-axis output value Vyi (i=1, . . . n), z-axis output value Vzi (i=1, . . . n) are stored (pooled) in the output register 145. The acquisition interval of the output value is set to, for example, be constant.

After the EC/KBC 124 acquires the output values n times, the EC/KBC 124 computes a rank Rx of the Vx1, . . . Vxn, a rank Ry of the Vy1, . . . Vyn and a rank Rz of Vz1, . . . Vzn stored in the output value register 145 (block S8). The rank refers to a difference between a maximum value and a minimum value used in statistics.

The EC/KBC 124 determines whether or not the rank Rx is smaller than the x-axis rest threshold Vtx registered in the rest determination threshold register 146 (block S9).

If the rank Rx is higher than the x-axis rest threshold Vtx (No in block S9), the EC/KBC 124 recognizes that drift correction cannot be executed because the computer 10 is not at rest and then returns to block S2, in which "determination on temperature change" is carried out.

If the x-axis rank Rx is smaller than the x-axis rest threshold Vtx (Yes in block S9), it is determined that the computer 10 is at rest and the EC/KBC 124 as the rest determining unit determines whether or not the computer is moving along the y-axis (block S10). The EC/KBC 124 determines whether or not the y-axis rank Ry is smaller than the y-axis rest threshold Vty registered in the rest determination threshold register 146. If the y-axis rank Ry is equal to or higher than the y-axis rest threshold Vty (No in block S10), the EC/KBC 124 recognizes that drift correction cannot be executed because the computer 10 is not at rest and then returns to block S2, in which "determination on temperature change" is carried out.

If the y-axis rank Ry is smaller than the y-axis rest threshold Vty (Yes in block S10), the EC/KBC 124 recognizes that the computer 10 is at rest on the y-axis and the EC/KBC 124 as the rest determining unit determines whether or not the computer 10 is moving along the z-axis (block S11). The EC/KBC 124 determines whether or not the z-axis rank Rz is smaller than the z-axis rest threshold Vtz registered in the rest determination threshold register 146. If the z-axis rank Rz is equal to or higher than the z-axis rest threshold Vtz (No in block S), the EC/KBC 124 recognizes that drift correction cannot be executed because the computer 10 is not at rest and returns to block S2, in which "determination on temperature change" is carried out.

If the z-axis rank Rz is smaller than the z-axis rest threshold Vtz (Yes in block S11), the EC/KBC 124 determines that the computer 10 is at rest on the z-axis. If the EC/KBC 124 determines that the computer 10 is not moving along the x-axis, y-axis or z-axis, it executes a processing for determining whether or not the computer 10 is parallel to a horizontal plane which is a plane perpendicular to the axis of gravity. Hereinafter, a condition "the computer 10 is parallel to the horizontal plane" may be expressed as "the computer 10 is horizontal".

The "rest determination processing" will be described by exemplifying an example of block S9.

It is assumed that the measurement is carried out five times at an acquisition interval of 10 ms and that the x-axis rest threshold Vtx is 5 mV.

A case where the x-axis output value is Vx1=1650 [mV], Vx2=1647 [mV], Vx3=1653 [mV], Vx4=1648 [mV], Vx5=1651 [mV] will be described. Since the rank Rx at this time is that the maximum value is Vx3=1653 and the minimum value is Vx2=1647, it comes that Vx3−Vx2=1653 [mV]−1647 [mV]=6 [mV]. Since the rank Rx is higher than the x-axis rest threshold Vtx if the rank Rx (6 [mV]) is compared with the x-axis rest threshold Vtx (5 [mV]), the procedure returns to block S2, in which the processing of "determination on temperature difference" is carried out.

A case where the x-axis output value is Vx1=1650 [mV], Vx2=1648 [mV], Vx3=1652 [mV], Vx4=1649 [mV], Vx5=1651 [mV] will be described. Since the rank at this time is that the maximum value is Vx3=1652 and the minimum value is Vx2=1648, it comes that Vx3−Vx2=1652 [mV]−1648 [mV]=4 [mV]. Since the rank Rx is smaller than the x-axis rest threshold Vtx if the rank Rx (4 [mV]) is compared with the x-axis rest threshold Vtx (5 [mV]), about the y-axis also, the rank Ry is compared with the y-axis rest threshold Vty.

The above-described rest determination processing can be expressed as acquiring the output values Vx, Vy, and Vz outputted from the acceleration sensor 131 in succession every predetermined time and determining whether or not the computer 10 is at rest corresponding to dispersion of acquired plural output values.

After it is determined that the computer 10 is at rest, the EC/KBC 124 computes a level determination range used for determining whether or not the computer 10 is horizontal (block S12). The lower limit value Vltx and the upper limit value Vutx of the x-axis level determination range and the lower limit value Vlty and the upper limit value Vuty of the y-axis reference range are obtained according to the following expression.

Vltx=Voffset_x [mV]−Vtdx [mV/° C.]×|ΔT|

Vutx=Voffset_x [mV]+Vtdx [mV/° C.]×|ΔT|

Vlty=Voffset_y [mV]−Vtdy [mV/° C.]×|ΔT|

Vuty=Voffset_y [mV]+Vtdy [mV/° C.]×|ΔT|

Here, the Voffset_x and Voffset_y stored in the offset value register 141 are offset values (reference voltage) currently used. The Vtdx and Vtdy are temperature drift characteristics, which are obtained from sensitivity (output change [mV/g] per 1 G) obtained as a specification of the acceleration sensor and the temperature characteristic (detected gravity change [mg/° C.] per 1° C.). AT is a temperature amount change obtained in block S3, which is a value registered in the temperature difference register 144 in block S5.

The EC/KBC 124 obtains an output value Vx of the x-axis, an output value Vy of the y-axis and an output value Vz of the z-axis from the acceleration sensor 131 (block S13). Since the detection sensitivity of the z-axis which is directed perpendicularly to the level plane is low when the computer 10 is substantially level, the output values of the x-axis and y-axis are obtained to determine whether or not the computer 10 is level. However, the output value Vz of the z-axis is measured because the output value Vz of the z-axis may be necessary later.

To determine whether or not the computer is inclined with respect to the x-axis, the EC/KBC 124 determines whether or not an x-axis inclination determination range (Vltx, Vutx) computed in block S12 and an x-axis output value Vx measured in block S13 satisfy a condition of Vltx<Vx<Vutx (block S14).

Since it is determined that the computer 10 is not level but inclined to the x-axis (back and forth direction of the computer 10 in FIG. 1) when the condition of Vltx<Vx<Vutx is not satisfied (No in block S14), the procedure returns to block S2, in which a temperature is measured.

If the condition of Vltx<Vx<Vutx is satisfied (Yes in block S14), the EC/KBC 124 determines whether or not the y-axis inclination determination range (Vlty, Vuty) computed in block S12 and the y-axis acceleration Vy measured in block S13 satisfy the condition of Vlty<Vy<Vuty in order to determine whether the computer 10 is inclined to the y-axis (block S15).

Unless the condition of Vlty<Vy<Vuty is satisfied (No in block S15), the EC/KBC 124 recognizes that the computer 10 is not level but inclined to the y-axis (right and left direction of the computer 10 in FIG. 1) and returns to block S2, in which the temperature is measured.

If the condition of Vlty<Vy<Vuty is satisfied (Yes in block S15), the EC/KBC 124 as the offset value updating unit registers a new offset value corresponding to an output value (voltage value) acquired in block S13 in the offset value register 141 and updates the reference temperature register 142 with a temperature measured in block S2 as the reference temperature (block S16).

If the automatic correction function is ON after the correction is completed, the procedure returns to "determination on temperature difference" with the offset value and temperature memorized in this block as previous correction values.

Hereinafter, this level determination processing will be described more specifically.

When the offset value of the x-axis output value and offset value of the y-axis output value, stored in the offset value register 141 are 1650 [mV] both, the temperature difference ΔT stored in the temperature difference register 144 is 3 [° C.] and the temperature drift is 1 [mV/° C.], the x-axis inclination determination range (Vltx, Vutx) can be computed as follows. Since the offset values are equal, the x-axis inclination determination lower limit value Vltx and the y-axis inclination determination lower limit value Vlty become the same value and the x-axis inclination determination upper limit value Vutx and the y-axis inclination determination upper limit value Vuty become the same value.

Vutx=Vuty=1650 [mV]+1 [mV/° C.]×|3 [° C.]|=1650 [mV]+3 [mV]=1653 [mV]

Vltx=Vlty=1650 [mV]−1 [mV/° C.]×|3 [° C.]|=1650 [mV]−3 [mV]=1647 [mV]

If the x-axis output value Vx and the y-axis output value Yy acquired in block S13 are Vx=1649 [mV] and Vy=1646 [mV], the procedure returns to "determination on temperature difference" because the y-axis output value Vy is smaller than the x-axis inclination determination lower limit value Vltx.

Further, if the x-axis output value Vx and the y-axis output value Vy acquired in block S13 are Vx=1649 [mV] and Vy=1648 [mV], the procedure proceeds to "update of offset value" because Vltx(Vlty)<Vx(Vy)<Vutx(Vuty) is satisfied.

The "update of offset value" in block S16 will be described more in detail. Since no force is applied to the x-axis or y-axis in the correction value or under the corrected rest condition, the output values Vy, Vz from the acceleration sensor 131 can be adopted as offset values Voffset_x, Voffset_y. However, the Z-axis output value Vz cannot be adopted as an offset value as it is because it is a value affected by the gravity (+1 G). Thus, the offset value Voffset_z is obtained as follows.

Voffset_z [mV]=Vz [mV]−Sz [mV/G]×1 [G], where Sz is the sensitivity of the z-axis of the acceleration sensor 131 and indicates which output value changes how when the gravity changes by 1 G.

For example, if the Z-axis output value Vz of the acceleration sensor 131 is 2200 [mV] and the sensitivity S of the acceleration sensor 131 is 500 [mv/G], the following expression can be obtained.

Voffset_z [mV]=2200 [mV]−500 [mV/G]×1 [G]=1700 [mV]   [Formula 4]

In the meantime, the sensitivity characteristic is specified as a specification of the acceleration sensor. Generally, the temperature drift of the sensitivity is smaller than the offset.

According to this embodiment, the personal computer 10 determines the offset value corresponding to the output values Vx, Vy, Vz of the acceleration sensor 131 at rest and in the horizontal condition, and thus the temperature characteristic of the output value has nothing to do with the offset value. Thus, despite a difference among apparatuses, the offset value can be corrected at a high precision.

To obtain a level determination range, it is permissible to determine whether or not the computer 10 is level by comparing a product |ΔT|Vtdx, |ΔT|Vtdy of an absolute value |ΔT| of a temperature difference ΔT and temperature drift characteristics Vtdx, Vtdy with an absolute value (ΔVoffset_x, ΔVoffset_y) of a difference between the acquisition value (Vx, Vy) of the acceleration sensor 131 acquired in block S13 and offset values Voffset_x, Voffset_x stored in the offset value register 141.

That is, if ΔVoffset_x<|ΔT|Vtdx and ΔVoffset_y<|ΔT|Vtdy, it is determined that the computer 10 is level.

If the EC/KBC 124 is determined that the computer 10 is not level, it is permissible to urge a user to adjust the computer 10 into a level condition. For example, a message window W1 is displayed on the LCD 17 as shown in FIG. 4.

When the user presses an "OK" button B1, the procedure proceeds to next block "correction of acceleration offset". When the user presses a cancel button B2, a window message W2 is displayed on the LCD 17 as shown in FIG. 5.

If the user presses an OK button B3, the correction is canceled and the correction function is turned OFF. Further if the user presses a cancel button B4, the message window W1 is displayed on the LCD 17.

Although the above-described apparatus is provided with a 3-axis acceleration sensor, a 2-axis acceleration sensor may be provided.

A display or a game machine having the acceleration sensor as well as the personal computer may be equipped with the above-described correction function.

By user's providing semi-automatic setting unit for installing the apparatus main body in a horizontal position and recognizing that state, the inclination detection accuracy can be enhanced.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a main body;
   an acceleration sensor provided in the main body;
   a temperature sensor provided in the main body;
   offset value storage unit configure to store a reference temperature and an offset value corresponding to the reference temperature;
   acceleration computing unit configure to correct an output value from the acceleration sensor with an offset value stored in the offset value storage unit so as to obtain an acceleration of the main body;
   temperature difference determining unit configure to determine whether or not an absolute value of a temperature difference between a measurement temperature measured by the temperature sensor and the reference temperature stored in the offset value storage unit exceeds a predetermined value;

rest determining unit configure to determine whether or not the main body is at rest based on an output value from the acceleration sensor, when the temperature difference determining unit determines that the absolute value of the temperature difference exceeds a predetermined value;

level determining unit configure to determine whether or not the main body is on the level based on the output value from the acceleration sensor and the offset value stored in the offset value storage unit, when the rest determining unit determines that the main body is at rest; and offset value updating unit for store a new offset value corresponding to an output value outputted from the acceleration sensor in the offset value storage unit and storing the measurement temperature in the offset value storage unit as a new reference temperature, when the level determining unit determines that the main body is on the level.

2. The electronic apparatus according to claim 1, wherein the rest determining unit acquires a plurality of output values outputted from the acceleration sensor in succession every predetermined time and determines whether or not the main body is at rest depending on dispersion of the acquired plural output values.

3. The electronic apparatus according to claim 1, wherein the level determining unit obtains an upper limit value and lower limit value using an absolute value of the temperature difference, an offset value stored in the offset value storage unit and a temperature characteristic of sensitivity of the acceleration sensor, and determines that the main body is on level when the output value outputted from the sensor is larger than the lower limit value and smaller than the upper limit value.

4. The electronic apparatus according to claim 1, wherein the level determining unit obtains a threshold using an absolute value of the temperature difference and a temperature characteristic of sensitivity of the acceleration sensor and, when a difference between the output value outputted from the sensor and the offset value stored in the offset value storage unit is smaller than the threshold, determines that the main body is on the level.

5. A method for correcting an offset value of an acceleration sensor in an information processing apparatus comprising an acceleration sensor provided on a main body, a temperature sensor provided in the main body, offset value storage unit for storing a reference temperature and an offset value corresponding to the reference temperature and acceleration computing unit for correcting an output value form the acceleration sensor based on the offset value so as to obtain an acceleration of the main body, the method comprising:

determining whether or not an absolute value of a temperature difference between the measurement temperature of the temperature sensor and a reference temperature exceeds a predetermined value;

determining whether or not the main body is at rest based on an output value from the acceleration sensor when the temperature difference exceeds a predetermined value;

determining whether or not the main body is on the level based on the output value from the acceleration sensor when it is determined that the main body is at rest; and storing a new offset value corresponding to the output value from the acceleration sensor used for determination on the level condition in the offset value storage unit and storing the measurement temperature in the offset value storage unit as a new reference temperature when it is determined that the main body is on the level.

6. The method for correcting an offset value of an acceleration sensor according to claim 5, wherein the determination about whether the main body is at rest comprises:

acquiring output values of a plurality of the acceleration sensors;

computing the rank of the output values of the plurality of the acceleration sensors; and determining whether or not the computed rank is smaller than a predetermined value.

7. The method for correcting an offset value of an acceleration sensor according to claim 5, wherein the determination about whether the main body is on the level comprises:

acquiring a plurality of output values outputted from the acceleration sensor in succession every predetermined time; and determining whether or not the main body is at rest corresponding to dispersion of a plurality of the acquired output values.

8. The method for correcting an offset value of an acceleration sensor according to claim 5, wherein the determination about whether or not the main body is on the level comprises:

acquiring a threshold using the absolute value of the temperature difference and a temperature characteristic of sensitivity of the acceleration sensor; and determining whether or not the difference between the output value outputted from the sensor and the offset value stored in the offset value storage unit is smaller than the threshold.

* * * * *